(12) United States Patent
Denham et al.

(10) Patent No.: US 9,814,353 B2
(45) Date of Patent: Nov. 14, 2017

(54) BARBEQUE GAS BURNER ASSEMBLY (71) Applicant: M5 SPORT GROUP (PTY) LTD, Durban (ZA)

(72) Inventors: Mark Anthony Denham, Durban (ZA); Michael Shane McAlery, Durban (ZA)

(73) Assignee: M5 SPORT GROUP (PTY) LTD, Durban (ZA)

( * ) Notice: Subject to any disclaimer, the term of this patent is extended or adjusted under 35 U.S.C. 154(b) by 37 days.

(21) Appl. No.: 14/914,425

(22) PCT Filed: Sep. 11, 2014

(86) PCT No.: PCT/IB2014/064440
§ 371 (c)(1),
(2) Date: Feb. 25, 2016

(87) PCT Pub. No.: WO2015/036958
PCT Pub. Date: Mar. 19, 2015

(65) Prior Publication Data
US 2016/0206147 A1   Jul. 21, 2016

(30) Foreign Application Priority Data

Sep. 12, 2013  (ZA) .................................. 2013/01849

(51) Int. Cl.
*A47J 37/07*    (2006.01)
*F24C 3/08*     (2006.01)
*F24C 3/00*     (2006.01)

(52) U.S. Cl.
CPC ....... *A47J 37/0713* (2013.01); *A47J 37/0786* (2013.01); *F24C 3/00* (2013.01); *F24C 3/08* (2013.01)

(58) Field of Classification Search
CPC ................ A47J 37/07; F24C 3/00; F24C 3/08
(Continued)

(56) References Cited

U.S. PATENT DOCUMENTS 3,500,813 A * 3/1970 Opdahl ................... F24C 15/12
                                                126/299 C
4,553,524 A * 11/1985 Wheat ................. A47J 37/0682
                                                126/15 R
(Continued)

FOREIGN PATENT DOCUMENTS

GB            2305358 A         4/1997

OTHER PUBLICATIONS

International Search Report, Application No. PCT/IB2014/064440, dated Nov. 21, 2014 (4 pages).
(Continued)

*Primary Examiner* — Gregory Huson
*Assistant Examiner* — Nikhil Mashruwala
(74) *Attorney, Agent, or Firm* — K&L Gates LLP (57) ABSTRACT

The invention relates to a barbeque gas burner assembly (1) comprising inner (2) and an outer (3) gas burners and inner (3) and outer (5) heat directing shields, wherein the inner burner (2) is located within a boundary defined by the outer burner (3) and in a spaced-apart relationship thereto; the outer heat-directing shield (5) comprises a collar (21) with an outwardly extending rim (23) at one end thereof that is angled away from the collar (21), with the collar (21) and rim (23) complimentary shaped and sized to the outer burner (3) for the rim (23) to be supportable by the outer burner (3); the inner heat-directing shield (4) comprises a collar (24) that is complimentary shaped and sized to the inner burner (2) to be supportable thereby, and the collar (24) includes an outwardly extending rim (26) at one end thereof that is angled away from the collar (24); operatively for the rim (23) of the outer heat-directing shield (5) to be supported by the outer burner (3) with the collar (21) extending upwards from the outer burner (3), the inner heat-directing shield (4) to be located within the collar (21) of the outer heat-directing
(Continued)

shield (5) with the collar (24) of the inner heat-directing shield (4) supported by the inner burner (2) to define an annular heat directing channel between the inner (4) and outer (5) heat-directing shields and to at least party shield each of the inner (2) and outer burners (3) against falling food debris.

14 Claims, 5 Drawing Sheets

(58) Field of Classification Search
USPC .................. 126/39 E, 39 K, 41 R, 25 R
See application file for complete search history.

(56) References Cited

U.S. PATENT DOCUMENTS

| | | | |
|---|---|---|---|
| 6,213,006 B1* | 4/2001 | Reardon | A47J 37/0704 |
| | | | 126/25 R |
| 8,166,870 B2* | 5/2012 | Badin | A47J 37/0682 |
| | | | 126/25 R |
| 8,938,870 B1* | 1/2015 | Bourgeois | A47J 37/0713 |
| | | | 126/25 R |
| 2010/0252020 A1 | 10/2010 | Siow | |
| 2016/0174717 A1* | 6/2016 | Mitchell | A47C 7/022 |
| | | | 297/183.5 |
| 2016/0183722 A1* | 6/2016 | Fisher | A47J 37/0704 |
| | | | 99/425 |

OTHER PUBLICATIONS

Written Opinion, Application No. PCT/IB2014/064440, dated Nov. 21, 2014 (3 pages).

* cited by examiner

BARBEQUE GAS BURNER ASSEMBLY

STATEMENT OF PRIORITY

This application is a U.S. national stage application, filed under 35 U.S.C. §371, of International Application Serial No. PCT/IB2014/064440, entitled "BARBEQUE GAS BURNER ASSEMBLY," which was filed on Sep. 11, 2014, and which claims the benefit of South Africa Provisional Patent Application Serial No. 2013/01849, entitled "A COOKING ARRANGEMENT FOR A GAS-OPERATED KETTLE-TYPE BARBEQUE," filed on Sep. 12, 2013, the disclosures of which are incorporated herein by reference in their entirety and for all purposes.

FIELD OF THE INVENTION

This invention relates to a cooking apparatus for a barbeque gas burner assembly which enables a barbeque to be used for various cooking operations.

BACKGROUND TO THE INVENTION

Barbeques, and specifically kettle-type barbeques, such as WEBER® and similar type barbeques, use combustible carbonaceous material such as charcoal or wood for cooking food. A problem with such barbeques is the ash produced during the combusting of the charcoal or wood which requires regular cleaning of the barbeque, and often results in ash being blown onto food being cooked on it.

There are also persistent concerns that combustion of some carbonaceous materials may be carcinogenic if the food cooked on it, especially meat being grilled is burnt. It appears possible to alleviate this risk by keeping food out of direct contact with flames and avoiding cooking food, especially meat, at high heat. This requires a level of control over the combustion process that is not always easy to achieve with a typical charcoal or wood kettle-type barbeque.

Gas-fuelled barbeques present a cleaner and more time-efficient manner of cooking. Such barbeques leave no ash from the combustion process and thus eliminate residue to clean up and avoid contamination of food with ash. Control of the flame height and heat is also very accurately done by regulating the pressurised gas supply to the barbeque from an associated gas cylinder, thus enabling easier avoidance or mitigation of the possible cancer risks associated with barbequing.

A problem with gas-fuelled barbeques is that food falling onto a gas burner, and especially dripping fat from meat in the process being barbequed, tend to block the numerous apertures of a gas burner. This causes uneven heating and the potential for fat catching fire and causing unexpected flaming. Although this is not necessarily dangerous to a person using the barbeque, it is often disconcerting, and the occurrence of the resulting high flames can cause burning of the food being barbequed.

OBJECT OF THE INVENTION

It is an object of the invention to provide a barbeque gas burner assembly which at least partly overcomes the above-mentioned problem.

SUMMARY OF THE INVENTION

In accordance with this invention there is provided a barbeque gas burner assembly comprising inner and an outer gas burners and inner and outer heat directing shields, wherein:

the inner burner is located within a boundary defined by the outer burner and in a spaced-apart relationship thereto;

the outer heat-directing shield comprises a collar with an outwardly extending rim at one end thereof that is angled away from the collar, with the collar and rim complimentary shaped and sized to the outer burner for the rim to be supportable by the outer burner;

the inner heat-directing shield comprises a collar that is complimentary shaped and sized to the inner burner to be supportable thereby, and the collar includes an outwardly extending rim at one end thereof that is angled away from the collar;

operatively for the rim of the outer heat-directing shield to be supported by the outer burner with the collar extending upwards from the outer burner, the inner heat-directing shield to be located within the collar of the outer heat-directing shield with the collar of the inner heat-directing shield supported by the inner burner to define an annular heat directing channel between the inner and outer heat-directing shields and to at least party shield each of the inner and outer burners against falling food debris.

There is further provided for the barbeque to preferably comprise a kettle-type barbeque, and for at least a section of each of the inner and outer burners to be shaped in a portion of a circle and for the collars and rims of the inner and outer heat-directing shields to be circularly cylindrically shaped.

There is still further provided for each of the collars of the inner and outer heat-directing shields to be tapered inwards from a base where each is connected to its rim, and for the opposing free end of each tapered collar to be truncated.

The invention further provides for the inner diameter of the free end of the tapered collar of the outer heat-directing shield to be greater than the rim diameter of the inner heat-directing shield.

There is further provided for the inner and outer burners to be located in the same operatively horizontal plane, and still further for the inner and outer burners to include independent gas flow controls.

A still further feature of the invention provides for each of the inner and outer burners to be provided with a plurality of receiving formations shaped and configured operatively to locate and support respectively the inner and outer heat-directing shields.

There is still further provided for each of the outer burner receiving formations to comprise a tab extending substantially horizontally outward from the upper surface of the outer burner, preferably terminating in operatively upward directed lip with the tabs configured such that the rim of the outer heat-directing shield is locatable on the tabs and the periphery of the rim is locatable within the boundary defined by the lips.

There is yet further provided for each of the inner burner receiving formations to comprise a tab extending substantially horizontally inward from the inner burner, with each tab terminating in a free end complimentary shaped and sized to a slot formed in the collar of the inner heat-directing shield, the collar including in number of plurality of slots equal to the number of the inner burner receiving formations, with the slots and receiving formations complimentary located operatively to allow the collar to be supported with the free end of each tab extending at least partly into a slot, and preferably for the free end of each tab to be orientated substantially vertical and the slots in the collar to be formed substantially vertical to allow the inner heat-directing shield to be slidably locatable on the tabs.

There is also provided for each of the inner and outer burners to include a support extending to operatively below it, with the supports shaped and dimensioned to support the burners in the base of a kettle-type barbeque, alternatively for the inner and outer burners to be locatable on at least one support bar extending between opposed points on walls of the barbeque.

These and other features of the invention are described in more detail below.

BRIEF DESCRIPTION OF THE DRAWINGS

Preferred embodiments of the invention are described by way of example only and with reference to the accompanying drawings in which.

DETAILED DESCRIPTION OF THE INVENTION

A preferred embodiment of a kettle-type barbeque gas burner assembly according to the invention is shown in the drawings.

The gas burner assembly (1) comprises inner (2) and outer (3) burners, and inner (4) and outer (5) outer heat-directing shields.

Figure 3:
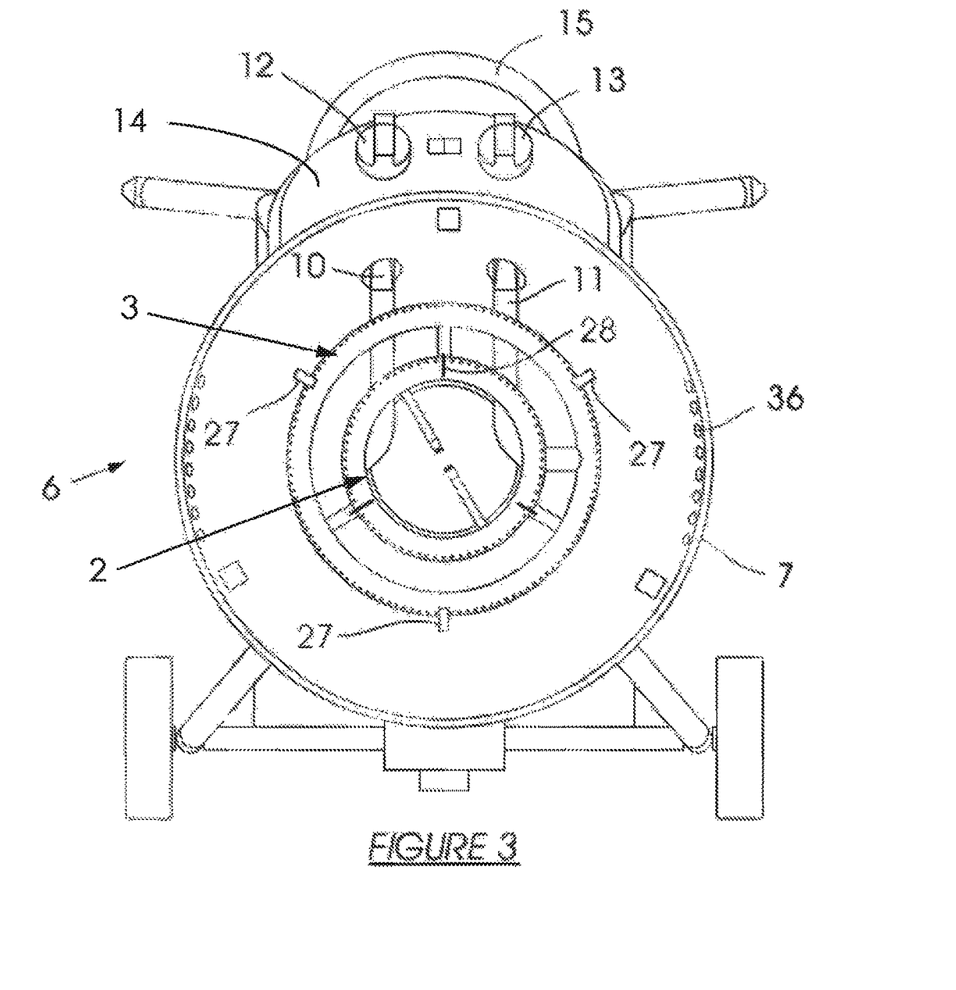
FIG. 3 is a plan view of the gas burner assembly of FIG. 1A with the inner and outer heat-directing shields removed.

The inner (2) burner is located within a boundary defined by the outer burner (3) and in a space-apart relationship thereto, as is evident from FIG. 3. The burners (2, 3) are utilized in a kettle-type barbeque (6), which has a generally semi-spherical body (7) and is provided with a complimentary shaped closable lid (8). The outer burner (3) is shaped to follow the internal shape of the barbeque body (7), which means it has a generally circular shape. The inner burner (2) is dimensioned to be located within the space described by the outer burner (3), and is thus also generally circular in shape, but with a smaller diameter than the outer burner (3), which allows it to be spaced-apart from the outer burner (3). Each of the burners (2, 3) is therefore circular in shape. The body (7) is provided with a row of apertures (36) in its rim on the sides of the body (7). This aids with airflow through the barbeque (6).

Figure 4A:
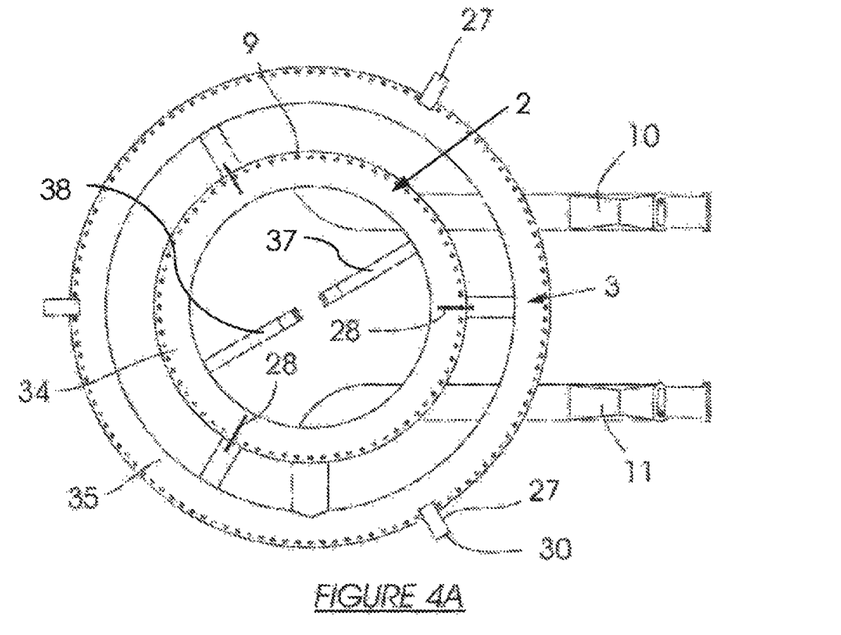
FIG. 4A is a plan view of the inner and outer gas burners of the gas burner assembly of FIG. 1.
Figure 4B:
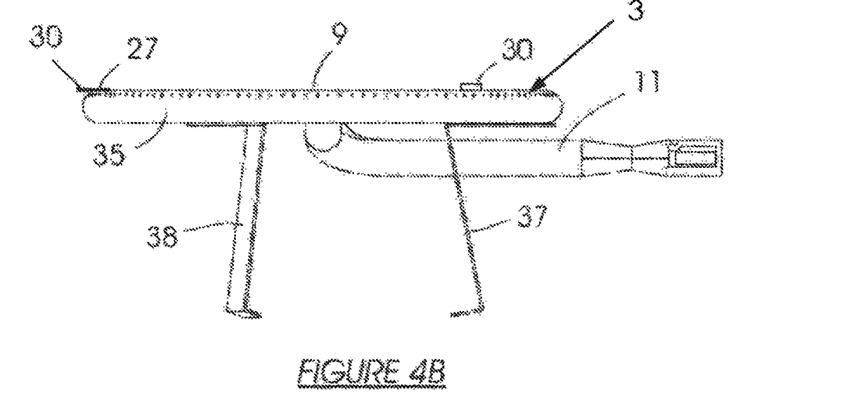
FIG. 4B is an elevation view of the inner and outer gas burners of the gas burner assembly of FIG. 1.
Figure 5A:
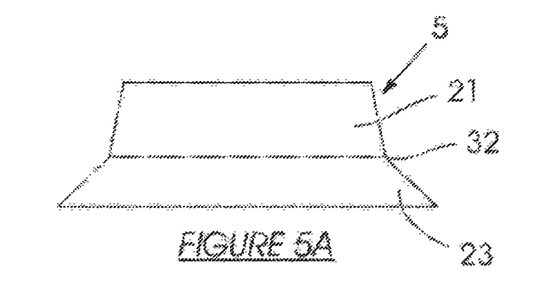
FIG. 5A is an elevation view of the outer heat-directing shield of FIG. 4.
Figure 5B:
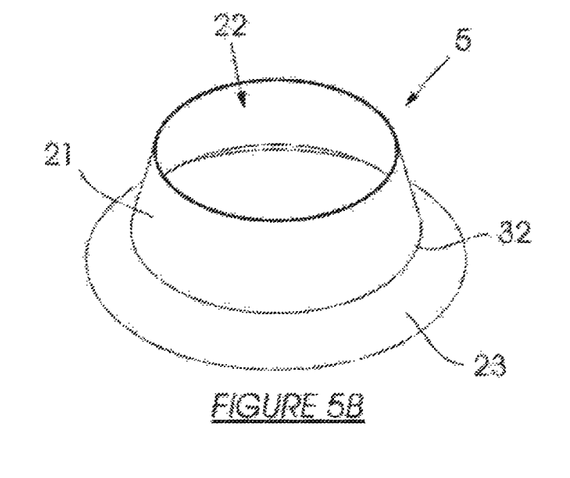
FIG. 5B is a perspective view of the outer heat-directing shield of FIG. 4.
Figure 6A:
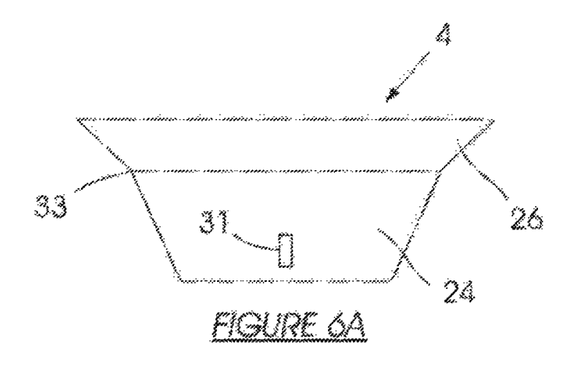
FIG. 6A is an elevation view of the inner heat-directing shield of FIG. 4.
Figure 6B:
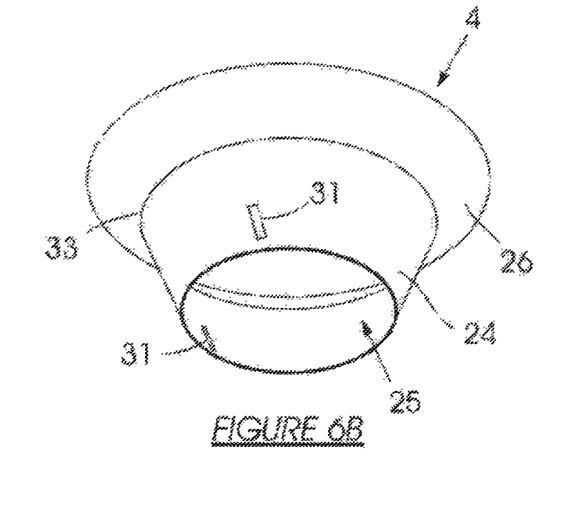
FIG. 6B is a perspective view of the inner heat-directing shield of FIG. 4.

As is evident from FIGS. 4A and 4B, the gas burners (2, 3) are formed as endless hollow tubes (34, 35), with a circular cross section and is provided with a plurality of apertures (9) along its length. Each burner (2, 3) is connected to a connector tube (10, 11), each of which is fed from a tube to which a regulator valve (12, 13) is secured, outside the body (7) of the barbeque (6). The connector tubes (10, 11) connect to the burner tubes (34, 35) from below, allowing the gas to flow around the tubes (34, 35) for optimal distribution of heat. Each tube (34, 35) is provided with a foot (37, 38) operatively supporting it in the base of the barbeque body (7).

The two regulator valves (12, 13) control the gas supply between the burners (2, 3) and an associated pressurised gas cylinder (not shown). For ease of use the two regulator valves (12, 13) are located on a control panel (14) extending from the barbeque body (7), and which is also provided with a convenient handle (15).

The barbeque (6) is also provided with a frame (16) supporting the barbeque body (7) and which terminates in four legs (17, 18), of which two (17) is provided with wheels (19) and the other two are secured to a support (20). The combination of the wheeled frame and the handle allows the barbeque (6) to be moved and located at will, with the support (20) allowing the barbeque (6) to remain in place where positioned.

Considering the gas burner assembly (1) in more detail, the two burners (2, 3) are located in the same operatively horizontal plane. In use, the two burners (2, 3) will thus be orientated substantially horizontally when the barbeque (6) is positioned for use.

The two heat-directing shields (4, 5) are used to direct heat from the two burners (2, 3), and to also shield the burners (2, 3) from dripping fat and falling food during the cooking process.

The outer heat-directing shield (5) is configured to cooperate with the outer burner (3). It comprises a truncated tapered circular cylindrical collar (21) which defines an opening (22), and which includes a rim (23) at the base (32) of the collar (21), which extends radially outwards and downwards from the collar (21).

The diameter of the opening (22) is about 20 cm, and to be more precise it is 198.4 mm. The outer diameter of the tapered collar (21) at its base (32) is 222.4 mm, creating the tapered shape thereof. The outer diameter of the rim (23) is about 29 cm, and to be more precise it is 298.4 mm.

The inner heat-directing shield (4) is configured to cooperate with the inner burner (2). It comprises a truncated tapered circular cylindrical collar (24) which defines an opening (25), and which includes a rim (26) at the base of the collar (24), which extends radially outwards and downwards from the collar (24).

The diameter of the collar (24) opening (25) is, to be precise, 100 mm. The outer diameter of the collar (24) at its base (33) is 140 mm, creating the tapered shape thereof. The outer diameter of the rim (26) is, to be precise, 190 mm.

As mentioned above, each of the burners (2, 3) is circular in shape. The outer diameter of the inner burner (2) is about 16 cm and the outer diameter of the outer burner (3) is about 29 cm. Each of the burners (2, 3) includes a set of three spaced apart receiving formations (27, 28). These formations (27, 28) take the form of metal tabs (27) extending outwardly from the outer burner (3) and metal tabs (28) extending inwardly from the inner burner (2).

In use, the outer heat-directing shield (5) is located on the metal tabs (27) of the outer burner (3), with its tapered cone directed upwards and thus away from the outer burner (3). The outer heat-directing shield (5) thus rests on the tabs (27) with its rim (23). The opening (22) of the outer heat-directing shield (5) is thus located above the outer burner (3). Each tab (27) terminates in an upward directed lip (30).

The set of lips (30) cooperate to define a boundary within which the rim (23) of the outer heat-directing shield (5) is locatable and supportable.

The inner heat-directing shield (4) is located on the vertically orientated metal tabs (28) of the inner burner (2), with its tapered cone directed downwards and thus though the inner burner (2). The inner heat-directing shield (4) includes a complimentary set of spaced apart slots (31) in its collar (24), into which the tabs (28) are locatable to support the inner heat-directing shield (4). The inner heat-directing shield (4) thus rests on the tabs (28) with its tapered collar (24), locating its rim (26) above the inner burner (2), and facing outwards towards the outer heat-directing shield (5).

Figure 1:
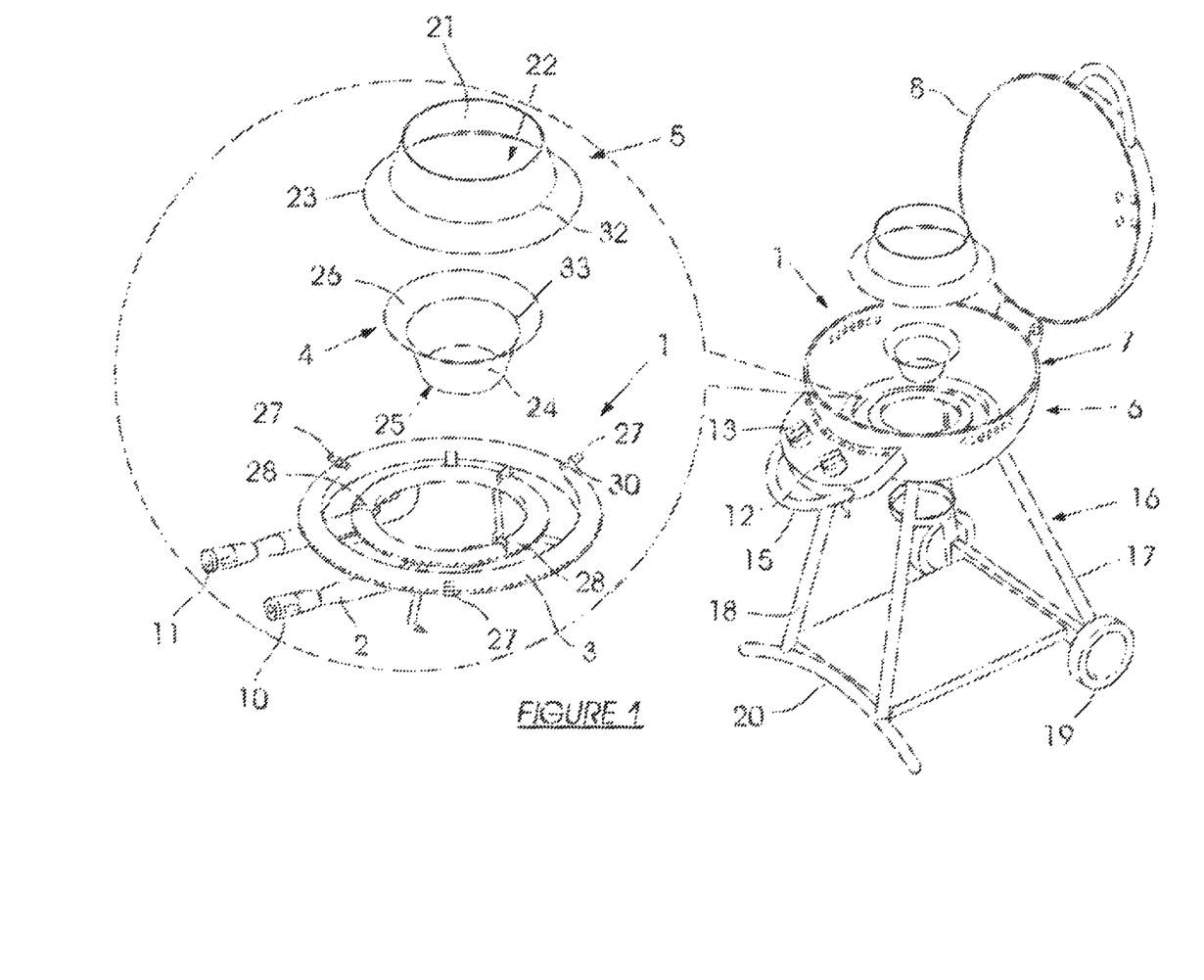
FIG. 1A is a perspective exploded view of a kettle-type barbeque gas burner assembly according to a first embodiment of the invention.
FIG. 1B shows a perspective exploded view of detail of the gas burner assembly of FIG. 1A.
Figure 2:
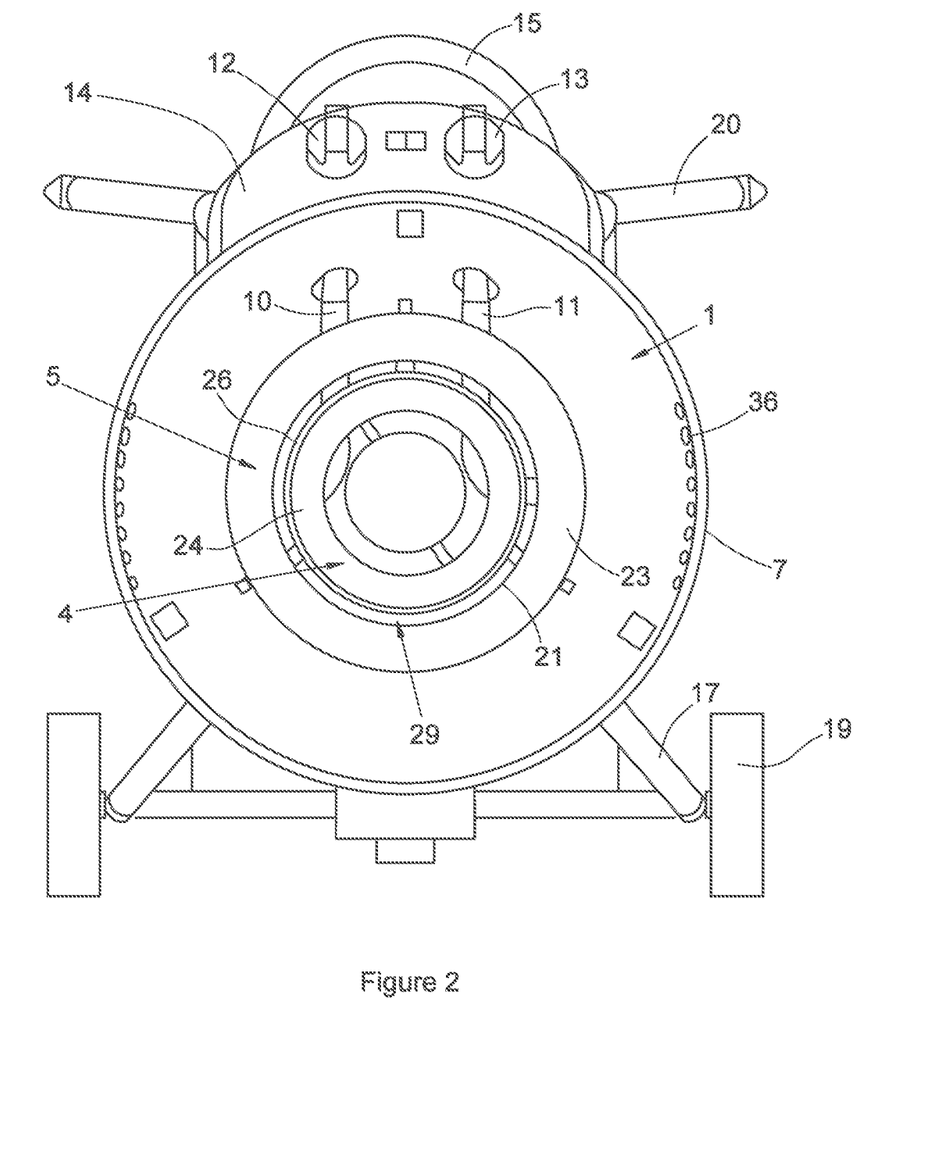
FIG. 2 is a plan view of the gas burner assembly of FIG. 1A.

The rim (26) of the inner heat-directing shield (4) thus faces the opening (22) of the outer heat-directing shield (5), and, as shown in FIG. 2, a narrow annular gap (29) is defined between them, which in this embodiment is about 3.4 mm wide.

The rims (23, 26) are directed respectively inwards of the inner burner (2) and outwards of the outer burner (3). This aids in directing dripping fat and falling debris away from the burners and very effectively shields both burners (2, 3) from such.

The heat-directing shields (4, 5) are thus used to direct heat within the barbeque (6) and to shield the burners (2, 3) from dripping fat and food debris.

Heat from the outer burner (3) is directed radially and evenly outwards towards the body (7) of the barbeque (6), from where it circulates upwards through the barbeque (6) for indirect grilling, cooking and baking. This in effect creates a convection oven in the barbeque (6).

Heat from the inner burner (2) is directed upwards through the annular gap (29), and may be used for direct cooking and searing of food, for example meat.

It will be appreciated that the embodiment described above is given by way of example only and is not intended to limit the scope of the invention. It is possible to amend aspects of the embodiment without departing from the essence of the invention.

It is for example possible to use burners having a shape other circular, such as oval, rectangular or square. In such an instance the two burners would still preferably be complimentary shaped to each other, and the heat-directing shields would be complimentary shaped and size to the burners.

The invention claimed is:

1. A barbeque gas burner assembly comprising inner and an outer gas burners and inner and outer heat directing shields, wherein the inner burner is located within a boundary defined by the outer burner and in a spaced-apart relationship thereto; the outer heat-directing shield comprises a collar with an outwardly extending rim at one end thereof that is angled away from the collar, with the collar and rim complimentary shaped and sized to the outer burner for the rim to be supportable by the outer burner; the inner heat-directing shield comprises a collar that is complimentary shaped and sized to the inner burner to be supportable thereby, and the collar includes an outwardly extending rim at one end thereof that is angled away from the collar; operatively for the rim of the outer heat-directing shield to be supported by the outer burner with the collar extending upwards from the outer burner, the inner heat-directing shield to be located within the collar of the outer heat-directing shield with the collar of the inner heat-directing shield supported by the inner burner to define an annular gap between the inner and outer heat-directing shields and to at least partly shield each of the inner and outer burners against falling food debris.

2. A gas burner assembly as claimed in claim 1 in which the barbeque is a kettle-type barbeque and at least a section of each of the inner and outer burners is shaped in a portion of a circle and the collars and rims of the inner and outer heat-directing shields are circularly cylindrically shaped.

3. A gas burner assembly as claimed in claim 2 in which the inner and outer burners comprise tubes configured in a circular shape and the collars and rims of the inner and outer heat-directing shields are circularly cylindrically shaped.

4. A gas burner assembly as claimed in claim 2 in which each of the collars of the inner and outer heat-directing shields is tapered inwards from a base where each is connected to its rim and the opposing free end of each tapered collar is truncated.

5. A gas burner assembly as claimed in claim 4 in which the inner diameter of the free end of the tapered collar of the outer heat-directing shield is greater than the rim diameter of the inner heat-directing shield.

6. A gas burner assembly as claimed in claim 1 in which the inner and outer burners are located in the same operatively horizontal plane.

7. A gas burner assembly as claimed in claim 1 in which the inner and outer burners include independent gas flow controls.

8. A gas burner assembly as claimed in claim 1 in which each of the inner and outer burners is provided with a plurality of receiving formations shaped and configured operatively to locate and support respectively the inner and outer heat-directing shields.

9. A gas burner assembly as claimed in claim 8 in which each of the outer burner receiving formations comprises a tab extending substantially horizontally outward from the upper surface of the outer burner, preferably terminating in operatively upward directed lip with the tabs configured such that the rim of the outer heat-directing shield is locatable on the tabs and the periphery of the rim is locatable within the boundary defined by the lips.

10. A gas burner assembly as claimed in claim 8 in which each of the inner burner receiving formations comprises a tab extending substantially horizontally inward from the inner burner, each tab terminating in a free end complimentary shaped and sized to a slot formed in the collar of the inner heat-directing shield, the collar including in number of plurality of slots equal to the number of the inner burner receiving formations, with the slots and receiving formations complimentary located operatively to allow the collar to be supported with the free end of each tab extending at least partly into a slot.

11. A gas burner assembly as claimed in claim 10 in which the free end of each tab is orientated substantially vertical and the slots in the collar are formed substantially vertical to allow the inner heat-directing shield to be slidably locatable on the tabs.

12. A gas burner assembly as claimed in claim 1 in which each of the inner and outer burners includes a support extending to operatively below it, with the supports shaped and dimensioned to support the burners in the base of a kettle-type barbeque.

13. A gas burner assembly as claimed in claim 1 in which the inner and outer burners are locatable on at least one support bar extending between opposed points on walls of the barbeque.

14. A gas burner assembly as claimed in claim 3 in which each of the collars of the inner and outer heat-directing shields is tapered inwards from a base where each is connected to its rim and the opposing free end of each tapered collar is truncated.

* * * * *